(12) United States Patent
Hennessey (10) Patent No.: US 10,433,639 B2
(45) Date of Patent: Oct. 8, 2019

(54) CONNECTION ADAPTER FOR MUSIC STAND

(71) Applicant: The Music People, Inc., Berlin, CT (US)

(72) Inventor: James R. Hennessey, West Hartford, CT (US)

(73) Assignee: The Music People, Inc., Berlin, CT (US)

(*) Notice: Subject to any disclaimer, the term of this patent is extended or adjusted under 35 U.S.C. 154(b) by 302 days.

(21) Appl. No.: 15/400,651

(22) Filed: Jan. 6, 2017

(65) Prior Publication Data
US 2017/0202350 A1    Jul. 20, 2017

Related U.S. Application Data

(60) Provisional application No. 62/281,054, filed on Jan. 20, 2016.

(51) Int. Cl.
| | | |
|---|---|---|
| *A47B 19/00* | (2006.01) | |
| *F16B 7/18* | (2006.01) | |
| *F16M 11/20* | (2006.01) | |
| *H04R 1/08* | (2006.01) | |
| *F16B 9/02* | (2006.01) | |

(52) U.S. Cl.
CPC ............. *A47B 19/002* (2013.01); *F16B 7/18* (2013.01); *F16M 11/2014* (2013.01); *H04R 1/08* (2013.01); *F16B 7/182* (2013.01); *F16B 9/026* (2013.01)

(58) Field of Classification Search
CPC .. A47B 19/002; F16M 11/2014; F16M 11/00; F16M 11/28; F16M 11/16; F16M 11/24; F16M 11/26; F16B 7/18; F16B 7/182; F16B 9/026; Y10T 403/55; Y10T 403/556
See application file for complete search history.

(56) References Cited

U.S. PATENT DOCUMENTS 4,760,984 A * 8/1988 Hennessey ............. F16B 21/16
  248/121
5,385,420 A * 1/1995 Newman, Sr. ........... B25G 3/04
  15/145
(Continued)

FOREIGN PATENT DOCUMENTS

CN          103174905 A      6/2013

OTHER PUBLICATIONS

Chinese Office Action Application No. 201710051267.7 Completed: Aug. 2, 2018 8 Pages.
(Continued)

*Primary Examiner* — Jonathan P Masinick
(74) *Attorney, Agent, or Firm* — Whitmyer IP Group LLC (57) ABSTRACT

An assembly includes a threaded male connector, a threaded female connector, and an adapter configured to be threadably connected to each of the threaded male connector and the threaded female connector. The adapter is configured such that at least one of the threaded male connector and the threaded female connector can be disconnected from the adapter by rotating a portion of the adapter relative to the threaded male connector and the threaded female connector while holding the threaded male connector and the threaded female connector positionally fixed relative to one another.

11 Claims, 6 Drawing Sheets

(56) References Cited

U.S. PATENT DOCUMENTS

| | | | | |
|---|---|---|---|---|
| 5,711,709 | A * | 1/1998 | McCoy | F16B 7/182 |
| | | | | 464/106 |
| 6,233,807 | B1 * | 5/2001 | Werner | B23P 19/06 |
| | | | | 29/407.02 |
| 6,939,074 | B2 * | 9/2005 | Gethmann | F16K 31/44 |
| | | | | 403/43 |
| 8,448,405 | B2 * | 5/2013 | Schaefer | E04C 3/06 |
| | | | | 52/710 |
| 9,310,021 | B2 * | 4/2016 | Hennessey | F16M 11/10 |
| 9,752,605 | B2 * | 9/2017 | Papadopoulos | E04G 25/065 |
| 9,982,696 | B1 * | 5/2018 | Hennessey | F16B 7/182 |
| 2017/0081853 | A1 * | 3/2017 | Kim | E04G 21/12 |

OTHER PUBLICATIONS

Translated Chinese Office Action Application No. 201710051267.7 Completed: Aug. 2, 2018 7 Pages.

* cited by examiner

CONNECTION ADAPTER FOR MUSIC STAND

CROSS-REFERENCE TO RELATED APPLICATION

The present disclosure claims priority to U.S. Provisional Patent Application No. 62/281,054, filed Jan. 20, 2016.

TECHNICAL FIELD

The present disclosure generally relates to a connection adapter, and more particularly relates to a connection adapter for a music stand or another assembly used in the music industry and/or recording industry.

BACKGROUND

It is known to provide a music stand (e.g., to hold sheet music, a microphone, etc.) that includes a shaft and a base. The proximal end of the shaft can include a threaded portion configured to be threadably connected to a corresponding threaded portion of the base. The threaded portion of the shaft can be male and the threaded portion of the base can be female, or vice versa. The shaft and the base can be disconnected from one another by either (i) holding the base positionally fixed (e.g., with one's hands) and rotating the shaft relative to the base to disengage the threaded connection therebetween, or (ii) holding the shaft positionally fixed and rotating the base relative to the shaft to disengage the threaded connection therebetween. These options for disconnecting the shaft and the base can be annoying for a user. In some instances, for example, an object (e.g., a microphone, a tray, etc.) can be connected to the distal end of the shaft, which can make it difficult or impractical to rotate the shaft relative to the base. Also, the base is typically positioned on the floor, and thus it can be difficult or impractical to reach down and rotate the base relative to the shaft while holding the shaft positionally fixed. Aspects of the present invention are directed to these and other problems.

SUMMARY

According to an aspect of the present invention, an assembly is provided that includes a threaded male connector, a threaded female connector, and an adapter configured to be threadably connected to each of the threaded male connector and the threaded female connector. The adapter is configured such that at least one of the threaded male connector and the threaded female connector can be disconnected from the adapter by rotating a portion of the adapter relative to the threaded male connector and the threaded female connector while holding the threaded male connector and the threaded female connector positionally fixed relative to one another.

According to another aspect of the present invention, an adapter is provided that extends along an axis between a proximal end and a distal end thereof. The adapter includes a sleeve and a lug. The sleeve has an annular sidewall concentrically aligned about the axis. An inner surface of the sidewall defines a sleeve cavity and a plurality of threads. The sleeve also has an endwall with a cylindrical bore extending therethrough. The bore is concentrically aligned about the axis. The lug defines a plurality of threads on an outer surface thereof. The end of the lug is rotatably mounted relative to the endwall of the sleeve such that the lug is configured to rotate about the axis and relative to the sleeve.

In addition to, or as an alternative to, one or more of the features described above, further aspects of the present invention can include one or more of the following features, individually or in combination:

the threaded male connector is an externally threaded end portion of a shaft, and the threaded female connector is an internally threaded channel extending into a base;

the shaft extends along a longitudinal shaft axis in a direction between a proximal end and a distal end of the shaft, the shaft includes a tubular shaft wall and a cylindrical shaft channel defined by an inner surface of the shaft wall, the shaft channel extends through the shaft along the shaft axis, and an inner surface of the shaft wall defines a plurality of threads along at least a longitudinal section of the shaft channel near the proximal end of the shaft;

the base includes a base body and a cylindrical base lug extending upwardly from the base body, the base lug extends along a longitudinal base lug axis in a direction between a proximal end and a distal end of the base lug, the base lug has an outer surface extending circumferentially about the base lug axis, and the outer surface of the base lug defines a plurality of threads along at least a longitudinal section of the base lug near the distal end of the base lug;

the adapter extends along a longitudinal adapter axis in a direction between a proximal end and a distal end of the adapter, and the adapter includes an adapter sleeve, the adapter sleeve including: (i) an annular sidewall extending along and concentrically aligned about the adapter axis, an inner surface of the sidewall defining an adapter sleeve cavity and including a plurality of threads along at least a longitudinal section of the sidewall, and (ii) a flat endwall that extends across a distal end of the sidewall, the flat endwall including a cylindrical bore extending therethrough, the bore being concentrically aligned about the adapter axis;

the base and the shaft are threadably connected to the adapter, and the shaft axis, base lug axis, and the adapter axis are all parallel and aligned with one another;

disconnection of one or both of the shaft and the base from the adapter can be achieved by positionally fixing the shaft and the base relative to one another and rotating the adapter sleeve of the adapter about the adapter axis until the threaded connection between the adapter and one or both of the shaft and the base is disengaged;

the base lug is configured to be threadably connected to the inner surface of the sidewall such that at least a portion of the base lug is received within the adapter sleeve cavity;

the adapter further includes an adapter fastener, the adapter fastener is a screw that is passed through the bore in the endwall of the adapter sleeve;

the adapter further includes an adapter washer that extends longitudinally between a head portion of the adapter fastener and a proximal surface of the endwall of the adapter sleeve;

the adapter further includes an adapter lug, the adapter lug is cylindrical and extends along the adapter axis, the adapter lug defines a plurality of threads on the outer surface thereof, a proximal end of the adapter lug is rotatably mounted relative to the endwall of the adapter sleeve using the adapter fastener, such that the adapter lug is configured to rotate about the adapter axis and relative to the adapter sleeve;

the proximal end of the shaft is configured to be threadably connected to the adapter lug such that at least a portion of the adapter lug is received within the shaft channel;

the adapter further includes an adapter lug nut having an annular sidewall defining a bore and a plurality of threads on an inner surface that defines the bore, and the adapter lug nut being configured to be threadably connected to the adapter lug such that the adapter lug nut is positioned between the endwall of the adapter sleeve and the proximal end of the shaft;

the adapter lug nut is configured to be threadably wound toward a bottom of the adapter lug and eventually engaged with the endwall of the adapter sleeve such that the adapter lug nut at least hinders rotation of the adapter lug about the adapter axis and relative to the adapter sleeve;

the assembly is a music stand that includes the adapter, a base that includes an externally threaded base lug that forms the threaded male connector, and a shaft that includes an internally threaded shaft channel that forms the threaded female connector; and the threaded male connector is an externally threaded end portion of a first microphone boom, and the threaded female connector is an internally threaded channel extending into an end portion of a second microphone boom.

These and other aspects of the present invention will become apparent in light of the drawings and detailed description provided below.

DETAILED DESCRIPTION

Figure 1:
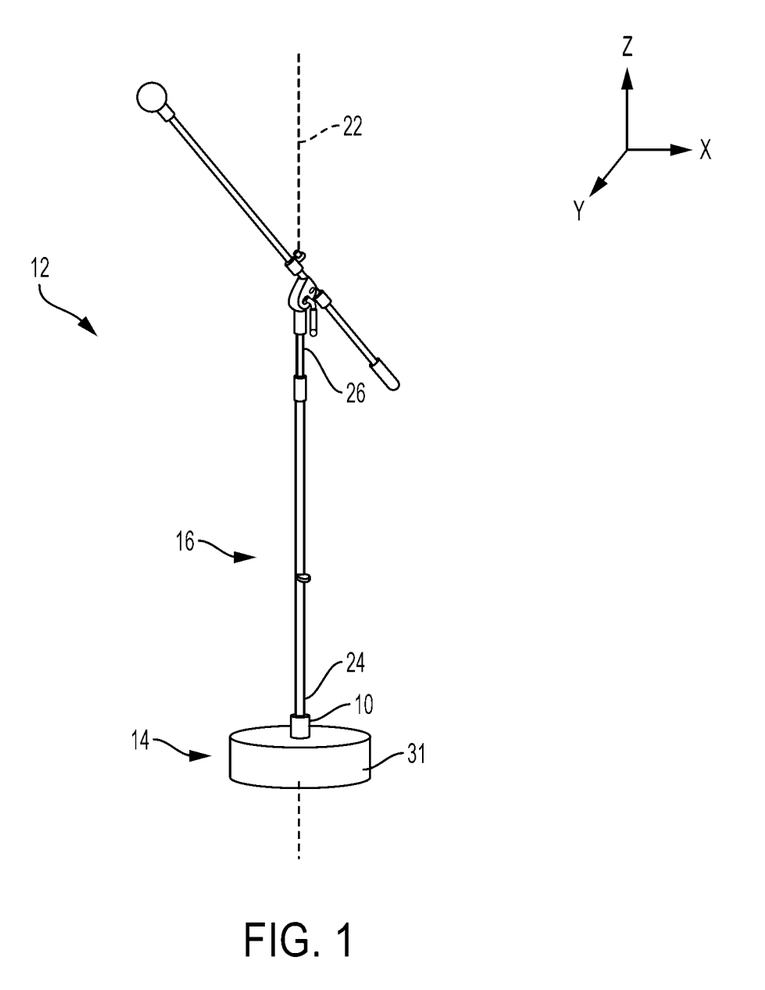
FIG. 1 is a perspective schematic view of an embodiment of the present assembly (i.e., music stand).

Referring to FIG. 1, the present disclosure describes a connection adapter 10 (hereinafter "adapter 10"), and an assembly 12 that includes the adapter 10, a threaded male connector, and a threaded female connector. The adapter 10 is configured to be threadably connected to both the threaded male connector and the threaded female connector. The adapter 10 is also configured such that the threaded male connector and/or the threaded female connector can be disconnected from the adapter 10 by rotating a portion of the adapter 10 relative to the threaded male connector and the threaded female connector while holding both positionally fixed relative to one another.

Figure 2A:
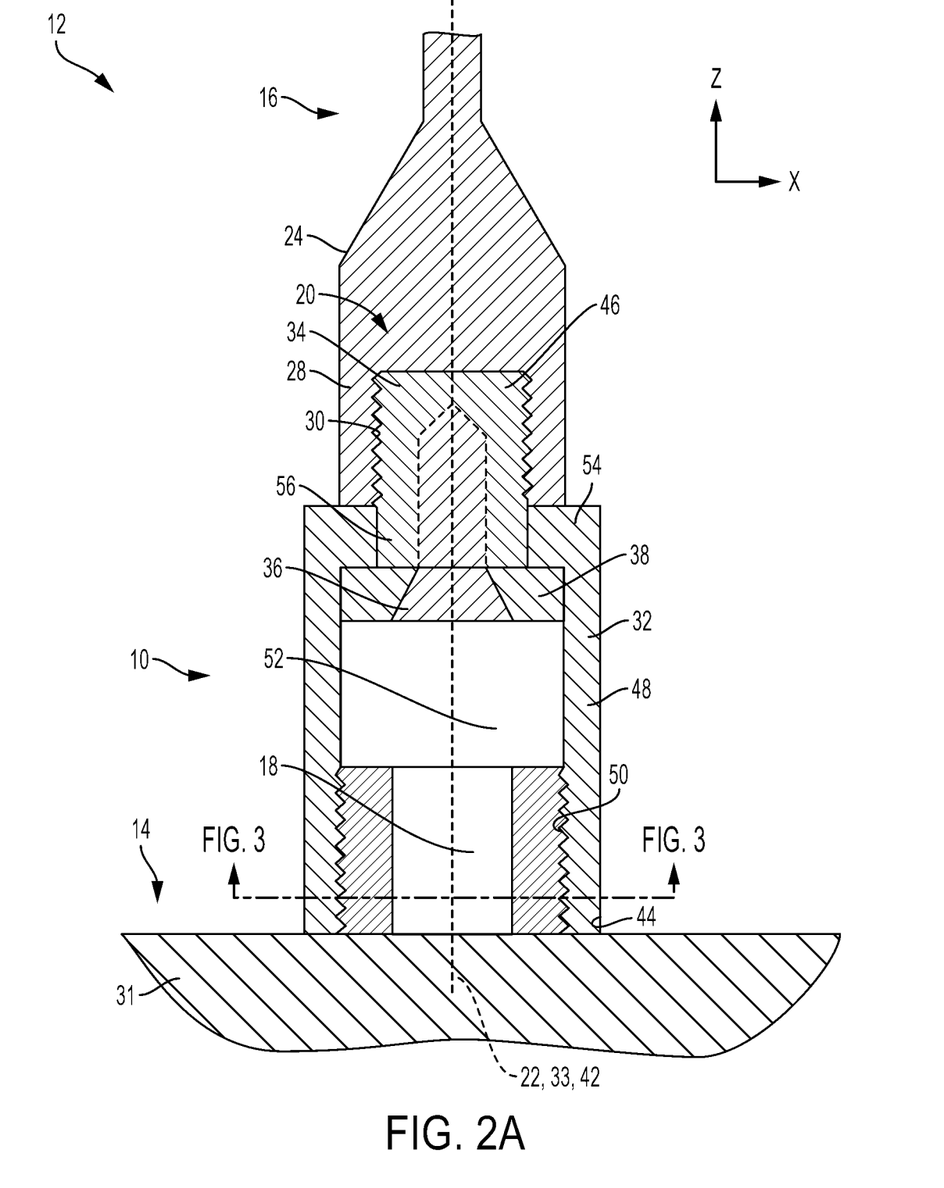
FIG. 2A is a cross-sectional schematic view of a portion of the assembly of FIG. 1.
Figure 2B:
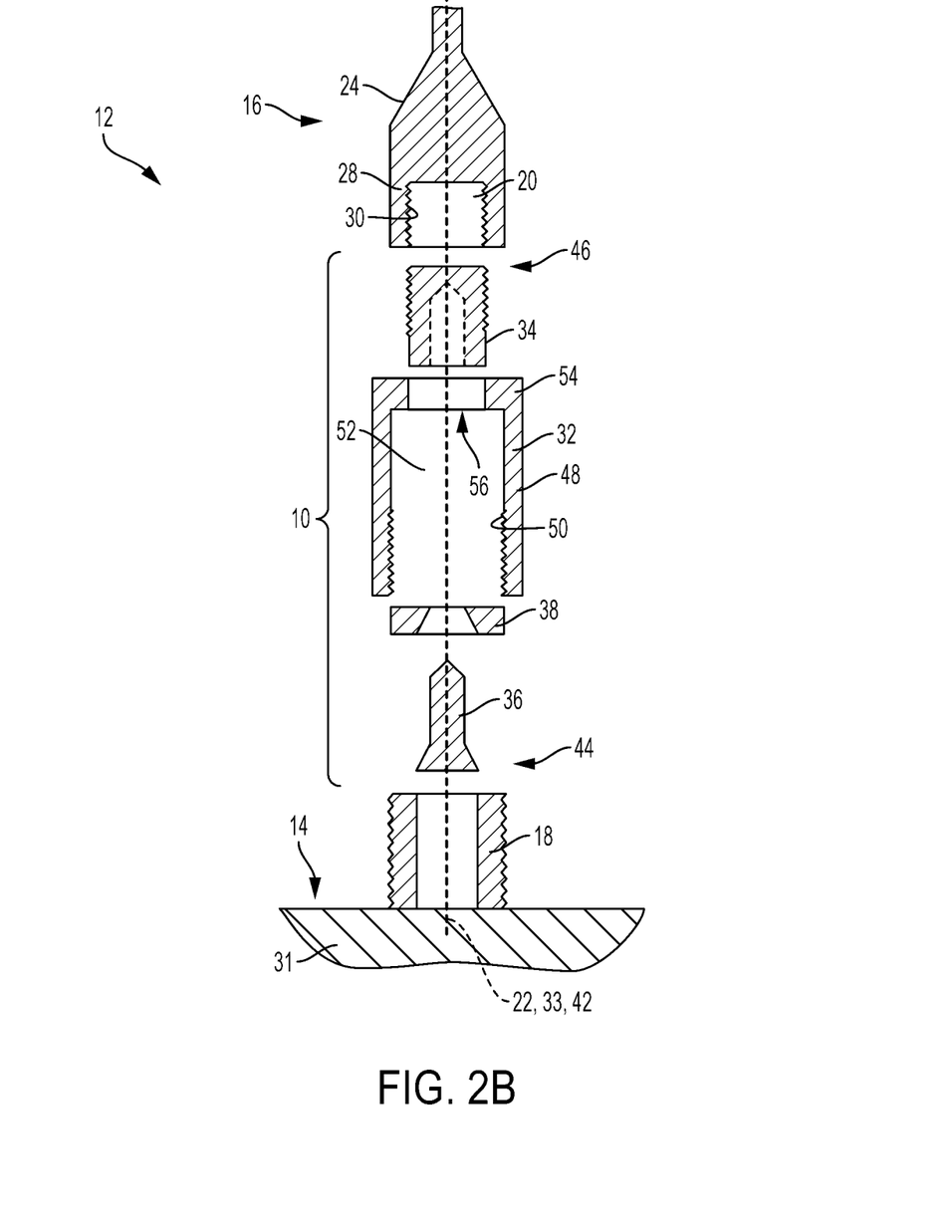
FIG. 2B is an exploded cross-sectional schematic view of a portion of the assembly of FIG. 1.
Figure 3:
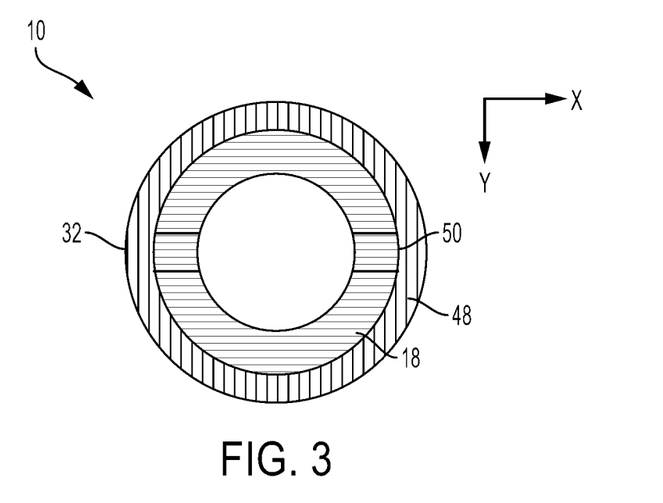
FIG. 3 is a bottom plan view of the adapter included in the assembly of FIG. 1.
Figure 4:
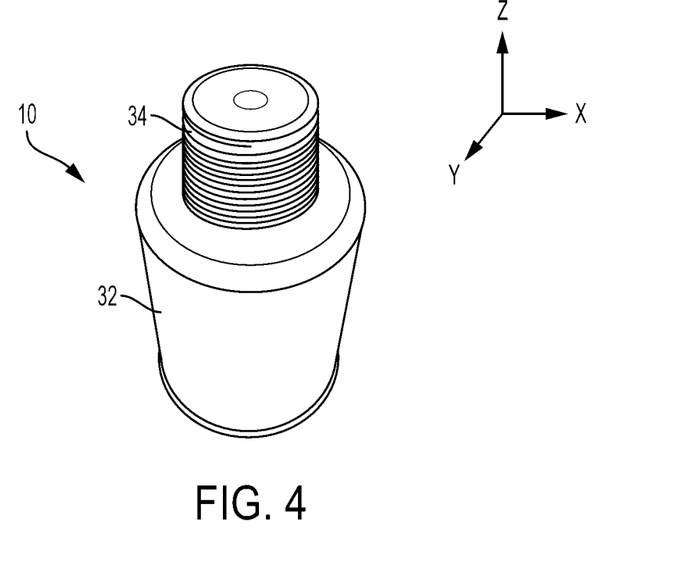
FIG. 4 is a perspective view of a prototype of the adapter included in the assembly of FIG. 1.

Referring to FIGS. 1, 2A, and 2B, in the illustrated embodiment, the assembly 12 is a music stand (e.g., for holding sheet music, a microphone, etc.) that includes the adapter 10, a base 14, and a shaft 16. As discussed in more detail below, the base 14 includes an externally threaded base lug 18 (see FIGS. 2A and 2B) that forms the threaded male connector, and the shaft 16 includes an internally threaded shaft channel 20 (see FIGS. 2A and 2B) that forms the threaded female connector. In other embodiments not shown in the drawings, the assembly can be something other than a music stand, and/or the threaded male and female connectors can be formed by various other components. In some embodiments, for example, the threaded male connector can be an externally threaded end portion of a shaft, and the threaded female connector can be an internally threaded channel extending into a base. As another example, in some embodiments the threaded male connector can be an externally threaded end portion of a first microphone boom, and the threaded female connector can be an internally threaded channel extending into an end portion of a second microphone boom.

Referring to FIG. 1, in the illustrated embodiment, the shaft 16 extends along a longitudinal shaft axis 22 in a direction between a proximal end 24 and a distal end 26 of the shaft 16. Referring to FIGS. 2A and 2B, the shaft 16 includes a tubular shaft wall 28 and a cylindrical shaft channel 20 defined by an inner surface 30 of the shaft wall 28. The shaft channel 20 extends through the shaft 16 along the shaft axis 22. The inner surface 30 of the shaft wall 28 defines a plurality of threads (e.g., helical or spiral ribs or grooves) along at least a longitudinal section of the shaft channel 20 near the proximal end 24 of the shaft 16.

Referring to FIGS. 2A and 2B, the base 14 includes a base body 31 and a cylindrical base lug 18 extending upwardly from the base body 31. The base lug 18 extends along a longitudinal base lug axis 33 in a direction between a proximal end (not shown) and a distal end of the base lug 18. The base lug 18 has an outer surface extending circumferentially about the base lug axis 33. The outer surface of the base lug 18 defines a plurality of threads (e.g., helical or spiral ribs or grooves) along at least a longitudinal section of the base lug 18 near the distal end of the base lug 18.

Figure 5:
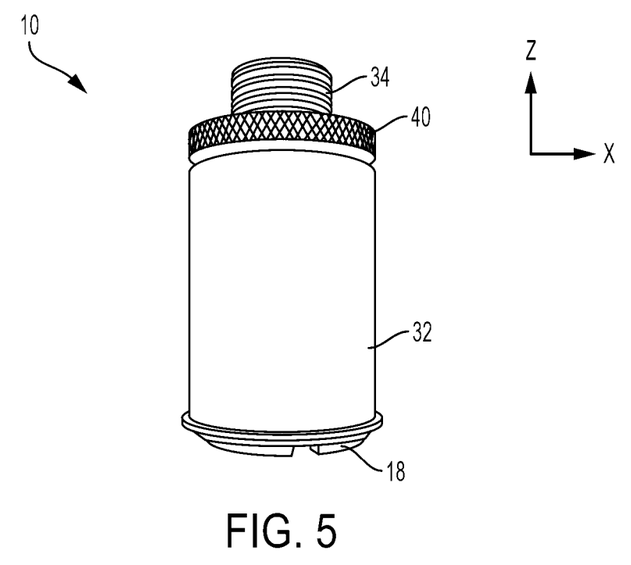
FIG. 5 is an elevation view of the prototype adapter of FIG. 4.
Figure 6:
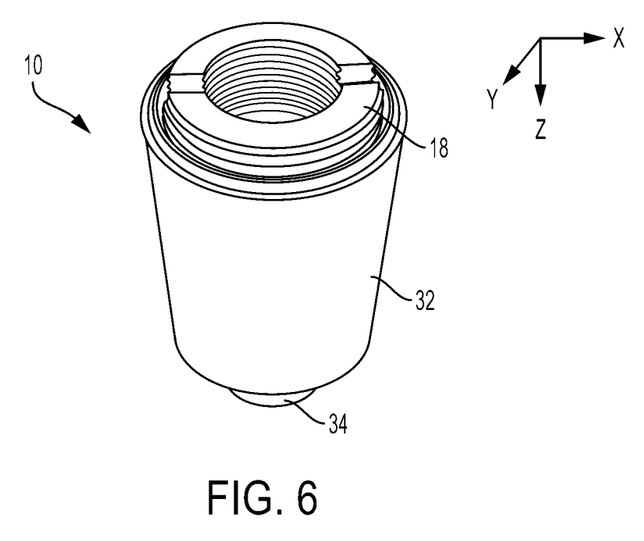
FIG. 6 is a bottom plan view of the prototype adapter of FIG. 4.
Figure 7:
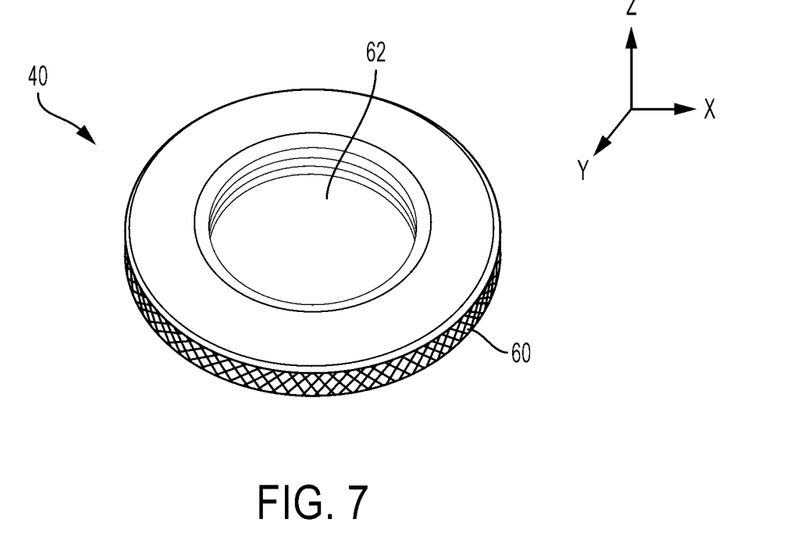
FIG. 7 is a perspective view of the lug ring of the prototype adapter of FIG. 4.

Referring to FIGS. 2A and 2B, the adapter 10 includes an adapter sleeve 32, an adapter lug 34, an adapter fastener 36, an adapter washer 38, and an adapter lug nut 40 (not shown in FIG. 2A or 2B, but see FIGS. 5 and 7). The adapter 10 extends along a longitudinal adapter axis 42 in a direction between a proximal end 44 and a distal end 46 of the adapter 10.

The adapter sleeve 32 includes an annular sidewall 48 extending along and concentrically aligned about the adapter axis 42. The inner surface 50 of the sidewall 48 defines an adapter sleeve cavity 52 and includes a plurality of threads (e.g., helical or spiral ribs or grooves) along at least a longitudinal section of the sidewall 48. The adapter sleeve 32 also includes a flat endwall 54 that extends across a distal end of the sidewall 48. The endwall 54 includes a cylindrical bore 56 extending therethrough. The bore 56 is concentrically aligned about the adapter axis 42.

The adapter lug 34 is cylindrical and extends along the adapter axis 42. The adapter lug 34 defines a plurality of threads (e.g., helical or spiral ribs or grooves) on the outer surface thereof. The proximal end of the adapter lug 34 is rotatably mounted relative to the endwall 54 of the adapter sleeve 32 using the adapter fastener 36, such that the adapter lug 34 can rotate about the adapter axis 42 and relative to the adapter sleeve 32. In the illustrated embodiment, the adapter fastener 36 is a screw that is passed through the bore 56 in the endwall 54 of the adapter sleeve 32. The adapter washer 38 extends longitudinally between a head portion of the adapter fastener 36 and the proximal surface of the endwall 54 of the adapter sleeve 32.

Referring to FIG. 7, the adapter lug nut 40 includes an annular sidewall 60 defining a bore 62 and a plurality of threads (e.g., helical or spiral ribs or grooves) on an inner surface that defines the bore 62. The adapter lug nut 40 is configured to be threadably connected to the adapter lug 34 such that the adapter lug nut 40 is positioned between the endwall 54 of the adapter sleeve 32 and the proximal end 24 of the shaft 16. The adapter 10 is configured so that if the adapter lug nut 40 is threadably wound toward the bottom of the adapter lug 34 and eventually engaged with the endwall 54 of the adapter sleeve 32, the adapter lug nut 40 can hinder or prevent rotation of the adapter lug 34 about the adapter axis 42 and relative to the adapter sleeve 32.

The components of the assembly 12 are configured so that, when the base 14 and the shaft 16 are threadably connected to the adapter 10, the shaft axis 22, base lug axis 33, and the adapter axis 42 are all parallel and aligned with one another.

To connect the shaft 16 and the adapter 10, the proximal end 24 of the shaft 16 is threadably connected to the adapter lug 34 such that at least a portion of the adapter lug 34 is received within the shaft channel 20. To connect the base 14 and the adapter 10, the base lug 18 is threadably connected to the inner surface 50 of the sidewall 48 such that at least a portion of the base lug 18 is received within the adapter sleeve cavity 52. The adapter lug nut 40 can be wound toward the bottom of the adapter lug 34 as described above to hinder or prevent rotation of the adapter lug 34 about the adapter axis 42 and relative to the adapter sleeve 32.

To disconnect one or both of the shaft 16 and the base 14 from the adapter 10, the shaft 16 and the base 14 are positionally fixed relative to another (e.g., prevented from rotating relative to one another), and the adapter sleeve 32 of the adapter 10 is rotated about the adapter axis 42 until the threaded connection between the adapter 10 and one or both of the shaft 16 and the base 14 is disengaged.

The present disclosure describes aspects of the invention with reference to the exemplary embodiments illustrated in the drawings; however, aspects of the invention are not limited to the exemplary embodiments illustrated in the drawings. It will be apparent to those of ordinary skill in the art that aspects of the invention include many more embodiments. Accordingly, aspects of the invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. An assembly, comprising:
   a threaded male connector;
   a threaded female connector; and
   an adapter configured to be threadably connected to each of the threaded male connector and the threaded female connector, and configured such that at least one of the threaded male connector and the threaded female connector can be disconnected from the adapter by rotating a portion of the adapter relative to the threaded male connector and the threaded female connector while holding the threaded male connector and the threaded female connector rotatably fixed relative to one another
   wherein the threaded male connector is an externally threaded end portion of a base, and the threaded female connector is an internally threaded channel extending into a shaft;
   wherein the shaft extends along a longitudinal shaft axis in a direction between a proximal end and a distal end of the shaft, the shaft includes a tubular shaft wall and a cylindrical shaft channel defined by an inner surface of the shaft wall, the shaft channel extends through the shaft along the shaft axis, and an inner surface of the shaft wall defines a plurality of threads along at least a longitudinal section of the shaft channel near the proximal end of the shaft;
   wherein the base includes a base body and a cylindrical base lug extending upwardly from the base body, the base lug extends along a longitudinal base lug axis in a direction between a proximal end and a distal end of the base lug, the base lug has an outer surface extending circumferentially about the base lug axis, and the outer surface of the base lug defines a plurality of threads along at least a longitudinal section of the base lug near the distal end of the base lug;
   wherein the adapter extends along a longitudinal adapter axis in a direction between a proximal end and a distal end of the adapter; and
   wherein the adapter includes an adapter sleeve, the adapter sleeve including:
      an annular sidewall extending along and concentrically aligned about the adapter axis, an inner surface of the sidewall defining an adapter sleeve cavity and including a plurality of threads along at least a longitudinal section of the sidewall; and
      a flat endwall that extends across a distal end of the sidewall, the flat endwall including a cylindrical bore extending therethrough, the bore being concentrically aligned about the adapter axis;
   wherein the base and the shaft are threadably connected to the adapter, and the shaft axis, base lug axis, and the adapter axis are all parallel and aligned with one another,
   wherein disconnection of one or both of the shaft and the base from the adapter can be achieved by rotably fixing the shaft and the base relative to one another and rotating the adapter sleeve of the adapter about the adapter axis until the threaded connection between the adapter and one or both of the shaft and the base is disengaged, and
   wherein the adapter further includes an adapter lug nut having an annular sidewall defining a bore and a plurality of threads on an inner surface that defines the bore, and the adapter lug nut being configured to be threadably connected to the adapter lug such that the adapter lug nut is positioned between the endwall of the adapter sleeve and the proximal end of the shaft.

2. The assembly of claim 1, wherein the base lug is configured to be threadably connected to the inner surface of the sidewall such that at least a portion of the base lug is received within the adapter sleeve cavity.

3. The assembly of claim 1, wherein the adapter further includes an adapter fastener, the adapter fastener is a screw that is passed through the bore in the endwall of the adapter sleeve.

4. The assembly of claim 3, wherein the adapter further includes an adapter washer that extends longitudinally between a head portion of the adapter fastener and a proximal surface of the endwall of the adapter sleeve.

5. The assembly of claim 4, wherein the adapter further includes an adapter lug, the adapter lug is cylindrical and extends along the adapter axis, the adapter lug defines a plurality of threads on the outer surface thereof, a proximal end of the adapter lug is rotatably mounted relative to the endwall of the adapter sleeve using the adapter fastener, such that the adapter lug is configured to rotate about the adapter axis and relative to the adapter sleeve.

6. The assembly of claim 5, wherein the proximal end of the shaft is configured to be threadably connected to the adapter lug such that at least a portion of the adapter lug is received within the shaft channel.

7. The assembly of claim 1, wherein the adapter lug nut is configured to be threadably wound toward a bottom of the adapter lug and eventually engaged with the endwall of the adapter sleeve such that the adapter lug nut at least hinders rotation of the adapter lug about the adapter axis and relative to the adapter sleeve.

8. The assembly of claim 1, wherein the assembly is a music stand that includes the adapter, a base that includes an externally threaded base lug that forms the threaded male connector, and a shaft that includes an internally threaded shaft channel that forms the threaded female connector.

9. The assembly of claim 1, wherein the threaded male connector is an externally threaded end portion of a first microphone boom, and the threaded female connector is an internally threaded channel extending into an end portion of a second microphone boom.

10. An adapter extending along an axis between a proximal end and a distal end thereof, the adapter comprising:

a sleeve having an annular sidewall concentrically aligned about the axis, an inner surface of the sidewall defining a sleeve cavity and a plurality of threads, the sleeve also having an endwall with a cylindrical bore extending therethrough, the bore concentrically aligned about the axis; and a lug defining a plurality of threads on an outer surface thereof, an end of the lug rotatably mounted relative to the endwall of the sleeve such that the lug is configured to rotate about the axis and relative to the sleeve, and an adapter washer that abuts an end of the lug remote from the plurality of threads thereon an adapter fastener, the adapter fastener is a screw that is passed through the adapter washer and received in the bore in the end of the lug remote from the plurality of threads thereon.

11. An assembly, comprising:

a threaded male connector;

a threaded female connector; and an adapter configured to be threadably connected to each of the threaded male connector and the threaded female connector and including an adapter sleeve, an adapter lug, an adapter washer, an adapter fastener receivable through a bore in the adapter washer and in a bore in the adapter lug, and an adapter lug nut, and thereby configured such that at least one of the threaded male connector and the threaded female connector can be disconnected from the adapter by rotating a portion of the adapter relative to the threaded male connector and the threaded female connector while holding the threaded male connector and the threaded female connector rotatably fixed relative to one another.

* * * * *